No. 659,145.　　　　　　　　　　　　　　　　Patented Oct. 2, 1900.
W. H. GOLDING.
COOKING UTENSIL.
(Application filed Feb. 6, 1900.)
(No Model.)
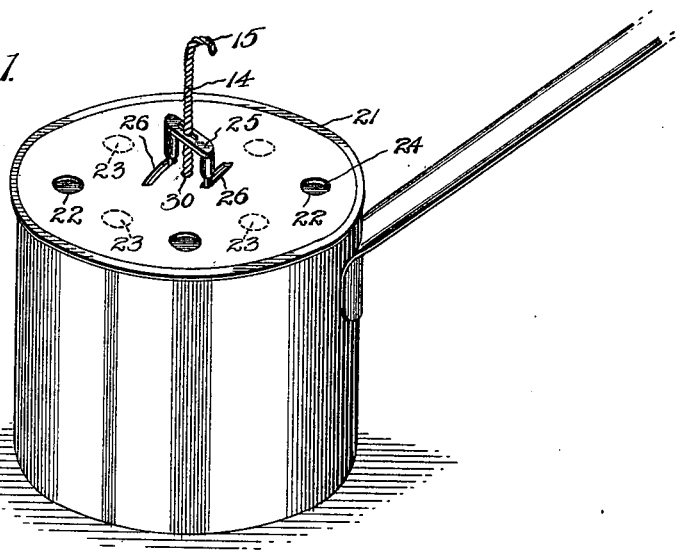
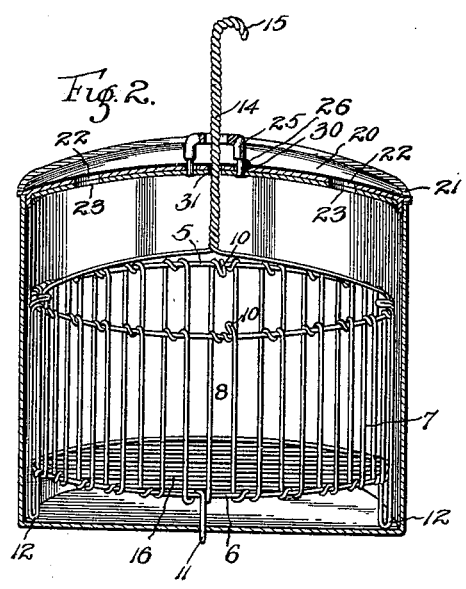
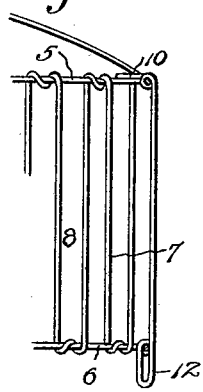
Witnesses
Ralph A. Shepard
H. E. Chandler
Inventor
W. H. Golding
by Chandler & Chandler
Attorneys
THE NORRIS PETERS CO., PHOTO-LITHO., WASHINGTON, D. C.

UNITED STATES PATENT OFFICE.

WILLIAM H. GOLDING, OF NEW YORK, N. Y.

COOKING UTENSIL.

SPECIFICATION forming part of Letters Patent No. 659,145, dated October 2, 1900.

Application filed February 6, 1900. Serial No. 4,239. (No model.)

*To all whom it may concern:*

Be it known that I, WILLIAM H. GOLDING, a citizen of the United States, residing at New York, (Flushing,) in the county of Queens, State of New York, have invented certain new and useful Improvements in Cooking Utensils; and I do hereby declare the following to be a full, clear, and exact description of the invention, such as will enable others skilled in the art to which it appertains to make and use the same.

This invention relates to cooking utensils in general, and more particularly to that class designed for boiling vegetables, eggs, &c., one object of the invention being to provide a construction by means of which the food may be immersed or withdrawn from the water in a kettle without scalding the hands of the cook and with which, moreover, the food may be drained.

A further object of the invention is to provide means for warming food by steaming, and thus prevent it from drying out.

In the drawings forming a portion of this specification, and in which like numerals of reference indicate similar parts in the several views, Figure 1 is a kettle equipped in accordance with the present invention. Fig. 2 is a central sectional perspective of a kettle and cover, the removable cage being shown in perspective. Fig. 3 is a detail view showing a portion of the cage.

Referring now to the drawings, the cage of the present invention comprises an upper horizontal ring 5 and a lower horizontal ring 6, connected by means of vertical parallel wires 7, consisting of a continuous wire 8, which is wrapped around the ring 5 and then taken down and around the ring 6 a suitable number of times and is then taken upwardly to the ring 5, this up and down movement being continued until the cylindrical body portion is complete. At four equally-distant points the loops of the wire 7 are bent inwardly and downwardly to form fingers 10, adapted to receive and support a plate. At two diametrically-opposite points the wires 7 are projected downwardly from the ring 6 to form supporting-feet 11, two additional feet 12 being secured at opposite points of the ring 6 and equidistant from the feet 11, the wires of which the feet 12 are formed being continued above the ring 5, after which they are bent inwardly until they meet and are then twisted together to form a handle 14, the upper end of which is bent to form a grip in the form of a hook 15. Transversely of the ring 6 are secured parallel wires 16, separated by slight interspaces, thus forming a complete wire cage. This cage is adapted to fit within a pot or kettle and with the feet of the cage resting upon the bottom of the pot or kettle and the handle 14 extending out through the top.

A cover for the kettle comprises a dished disk 20, having a flange 21, which lies against the inner face of the kettle to hold the cover in place. This disk has four openings 22 therein and which are adapted to register at times with similar openings 23 in a disk 24, which is pivotally mounted upon the under side of the disk 20, through the medium of a T-shaped handle 25, the extremities of which are passed through segmental slots 26 in the disk 20 and fixed to the disk 24. Thus as the handle 25 is oscillated, the disk 24 will be correspondingly moved to cover and uncover the openings 22.

Through the covering-disks 20 and 24 are formed alining perforations 30 and 31, through which the handle 14 is passed, said handle being extended through a central opening in the handle 25. Thus through the medium of either handle the cover and the cage may be removed from the kettle, while the cover alone may be removed by means of the handle 25.

In practice when it is desired to boil potatoes they may be placed in the cage, which is then placed in the kettle to immerse the potatoes in the water that has been previously put therein. The water in the kettle may be then heated, and when it has begun to boil the handle 25 may be operated to uncover the openings in the cover, so that the steam may escape and boiling over be prevented. When the potatoes have been sufficiently cooked, the cage may be drawn from the kettle and after draining the potatoes may be mashed through the interspaces between the wires of the bottom of the cage. Other vegetables may be treated in the same way with or without the mashing operation.

When it is desired to warm food, a plate containing the food may be placed on the inwardly-directed fingers 10 and the cage placed in the kettle, the plate being of course supported above the water-level, the result being that the food is retained in a moist condition and at the proper temperature.

Having thus described my invention, what I claim is—

1. The combination with a vessel having a cover provided with a handle and a cage within the vessel comprising upper and lower rings, wires connected with the rings to form sides, said wires being continued below the lower rings at points to form supporting-feet, inwardly-projecting fingers carried by the upper ring, and an additional wire having its end portions bent inwardly above the upper ring and twisted to form a handle, said handle being passed through the cover.

2. The combination with a vessel of a cover having openings therein, and segmental slots, a disk below the cover and having openings adapted to register with the openings of the cover, a handle having its ends passed through the slots of the cover and engaged with the disk, alining openings in the handle, disk, and centrally of the cover, a cage within the vessel comprising upper and lower rings, wires connected with the rings and forming sides, wires connected with the lower ring to form a bottom separated by interspaces, supporting-feet upon the lower ring, fingers carried by the upper ring and extending inwardly thereof and a handle for the cage extending through the alining opening in the cover, the disk and the handle of the cover.

In testimony whereof I affix my signature in the presence of two witnesses.

WILLIAM H. GOLDING.

Witnesses:
EDWARD M. ROE,
SARAH J. GOLDING.